United States Patent [19]
Home

[11] Patent Number: 6,138,709
[45] Date of Patent: Oct. 31, 2000

[54] OVERFILL PROTECTION DEVICE

[76] Inventor: William Home, 9 F/3, No. 374, Sec. 2, Pa-Teh Rd., Taipei, Taiwan

[21] Appl. No.: 09/013,887

[22] Filed: Jan. 27, 1998

[51] Int. Cl.$^7$ ............................ F16K 31/24; F16K 31/34; F16K 33/00
[52] U.S. Cl. .......................... 137/413; 137/444; 137/446; 141/198; 251/900
[58] Field of Search ................................. 137/430, 413, 137/446, 442, 443, 444; 141/198, 18; 251/900

[56] References Cited

U.S. PATENT DOCUMENTS

| | | | |
|---|---|---|---|
| 4,305,422 | 12/1981 | Bannink | 137/430 |
| 4,423,750 | 1/1984 | Morizumi et al. | 137/413 |
| 4,444,230 | 4/1984 | Van Mullem | 137/430 |
| 5,282,496 | 2/1994 | Kerger | 137/446 |
| 5,460,197 | 10/1995 | Kerger et al. | 137/413 |
| 5,487,404 | 1/1996 | Kerger | 137/446 |

FOREIGN PATENT DOCUMENTS

| | | | |
|---|---|---|---|
| 605477 | 1/1960 | Italy | 137/446 |

*Primary Examiner*—George L. Walton
*Attorney, Agent, or Firm*—A & J

[57] ABSTRACT

A overfill protection device includes a first tubular member, a cylindrical piston slidably fitted within the first tubular member, a spring arranged within the first tubular member and fitted over an intermediate portion of the piston, a first and second O-rings fitted in the first and second neck portions of the piston respectively, a second tubular member having an upper portion having a cylindrical recess open at a top and engaged with the first tubular member, a plug arranged within the second tubular member and located under the piston, a float rod having a cam plate at an upper end thereof, and a float fixedly connected with a lower end of the float rod, whereby no gas will be allowed to flow through the overfill protection device when the pressure within the gas tank exceeds a predetermined level.

4 Claims, 4 Drawing Sheets

OVERFILL PROTECTION DEVICE

BACKGROUND OF THE INVENTION

1. Field of the Invention

This invention is related to a overfill protection device and in particular to one which can prevent the gas pressure in a tank from going beyond the limits.

2. Description of the Prior Art

It has been found that the conventional overfill protection device utilizes a helical spring to push a piston upwardly to close a gas inlet so that the gas inlet will be opened only when the pressure applied to the piston by the gas being filled into a tank exceeds the pressure applied to the piston by the spring, and the gas inlet will be automatically shut off when the pressure within the tank exceeds a predetermined level. Furthermore, the piston is provided with a narrow passage for gas purging. Nevertheless, such a overfill protection device suffers from the following drawbacks:

1. Low gas supply capacity;
2. Long purging time; and
3. High in cost.

Therefore, it is an object of the present invention to provide an improved overfill protection device which can obviate and mitigate the above-mentioned drawbacks.

SUMMARY OF THE INVENTION

This invention is directed to an improved overfill protection device.

It is the primary object of the present invention to provide a overfill protection device which can prevent the pressure in a tank from going beyond the limits.

It is another object of the present invention to provide a overfill protection device which is of high gas supply capacity.

It is still another object of the present invention to provide a overfill protection device which has a very short purging time.

It is still another object of the present invention to provide a overfill protection device which is simple in construction.

It is a further object of the present invention to provide a overfill protection device which is cheap and easy to manufacture.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

DETAILED DESCRIPTION OF THE PREFERRED EMBODIMENT

Figures 1, 1A:
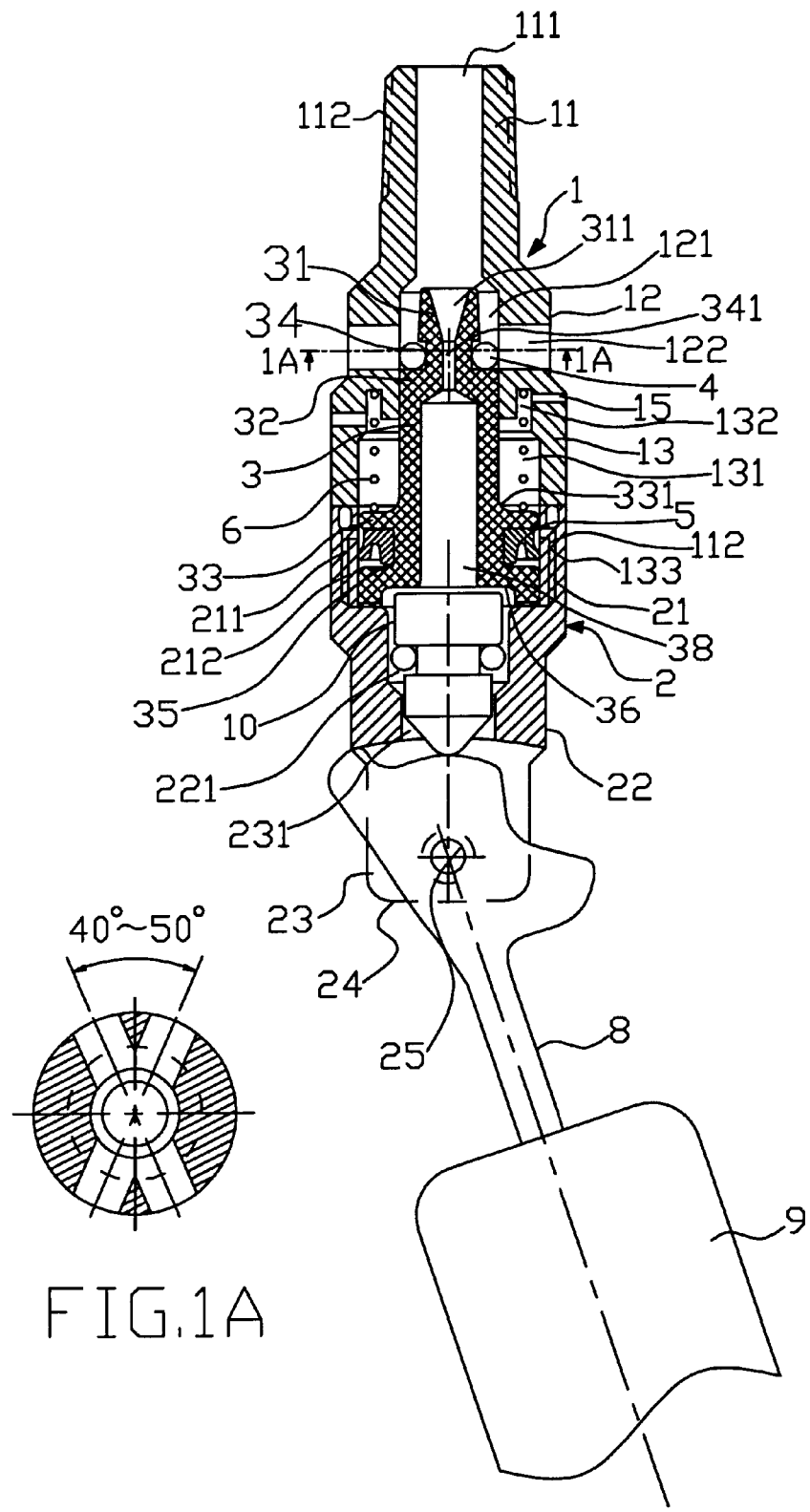
FIG. 1 is a longitudinal sectional view of a overfill protection device according to the present invention.
FIG. 1A is a sectional view taken along line 1A—1A of FIG. 1.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIG. 1 thereof, the overfill protection device according to the present invention generally comprises a first tubular member 1, a first tubular member 2, a piston 3, a first O-ring 4, a second O-ring 5, a compressed spring 6, a spindle 7, a float rod 8, a float 9, and a plug 10.

The first tubular member 1 has an upper portion 11 formed with a first axial through hole 111 and external threads 112, an intermediate portion 12 having a second axial through hole 121 with a larger diameter than the first axial through hole 111 of the upper portion 11 and four radial through holes 122, and a lower portion 13 having a third axial through hole 131 with a larger diameter than the second axial through hole 121 of the intermediate portion 12 and external threads 133. An annular groove 132 is formed between the second and third axial through holes 121 and 131. The first tubular member 1 is formed with a radial perforation 15 which extends therethrough to communicate with the annular groove 132 so that the pressure required for the operation of the piston 3 can be reduced thus making the overfill protection device become more sensitive. According to the experiment, the preferred diameter of the radial perforation 15 is around 1 mm+0.5 mm. As shown in FIG. 1A, two of the radial through holes 122 are aligned with the other two of the radial through holes 122 and the two axes through the four radial through holes 122 intersects at an angle of 40–50 degrees.

The piston 3 is a cylindrical member with an upper portion 31 dimensioned to fit into the first axial through hole 111 of the first tubular member 1, an intermediate portion 32 having a larger diameter than the upper portion 31 and dimensioned to fit into the second axial through 121 of the first tubular member 1, a lower portion 33 having a larger diameter than the intermediate portion 32 and dimensioned to fit into the third axial through hole 131 of the first tubular member 1, a first neck portion 34 between the upper and intermediate portions 31 and 32, a second neck portion 35 on lower portion 33, and a circular recess 36 at the bottom of the lower portion 33. The upper portion 31 of the piston 3 is formed with a conical through hole 311 having an upper diameter and a lower diameter which are in the ratio of three to one. The first neck portion 34 has an axial through hole 341 having the same diameter as the lower end of the conical through hole 311. An axial through hole 38 is formed in the intermediate and lower portions 32 and 33 and has an upper and lower ends communicated with the axial through hole 341 and the circular recess 36 respectively. The piston 3 is slidably disposed within the first tubular member 1.

The compressed spring 6 is arranged within the third axial through hole 131 of the lower portion 13 of the first tubular member 1 and fitted over the intermediate portion 32 of the piston 3, with its upper and lower ends respectively bearing against the annular groove 132 of the first tubular member 1 and the flange 331 of the lower portion 33 of the piston 3.

The first and second O-rings 4 and 5 are fitted in the first and second neck portions 34 and 35 of the piston 3, respectively.

The second tubular member 2 has an upper portion 21 having a cylindrical recess 211 open at the top and provided with internal threads 212 engageable with the external threads 112 of the first tubular member 1, an intermediate portion 22 having an axial through hole 221 with a smaller diameter than the third axial through hole 131 of the first tubular member 1, and a lower portion 23 having an axial through hole 231 with a smaller diameter than the axial through hole 221 of the intermediate portion 22. The lower end of the second tubular member 2 is divided by a diametrical slot 24 into two similar semi-cylindrical portions and has a radial circular hole 25 extending through the two semi-cylindrical portions.

The plug 10 is a cylindrical member having an upper portion 101 formed with a plurality of grooves 1011, a neck portion 102 under the upper portion 101 and fitted with a O-ring 1021, and a lower portion 103 having a smaller diameter than the axial through hole 231 of the second tubular member 2 and formed with conical lower end 1031. The plug 10 is arranged within the second tubular member 2 and located under the piston 3.

The float rod 8 is an elongated member having an cam plate 81 at the upper end formed with a circular hole 72. The cam plate 71 of the float rod 7 is fitted into the slot 24 of the second tubular member 2 and pivotally connected thereto by the spindle 7 extending through the radial circular hole 25 of the second tubular member 2 and the circular hole 72 of the float rod 8 so that the float rod 8 can be rotated with respect to the second tubular member 2. The cam plate 81 is contoured to form a lobe 85, a convex edge 84 and a concave edge 85. The lower end of the float rod 8 is fixedly secured to the interior of the float 9.

Figure 2:
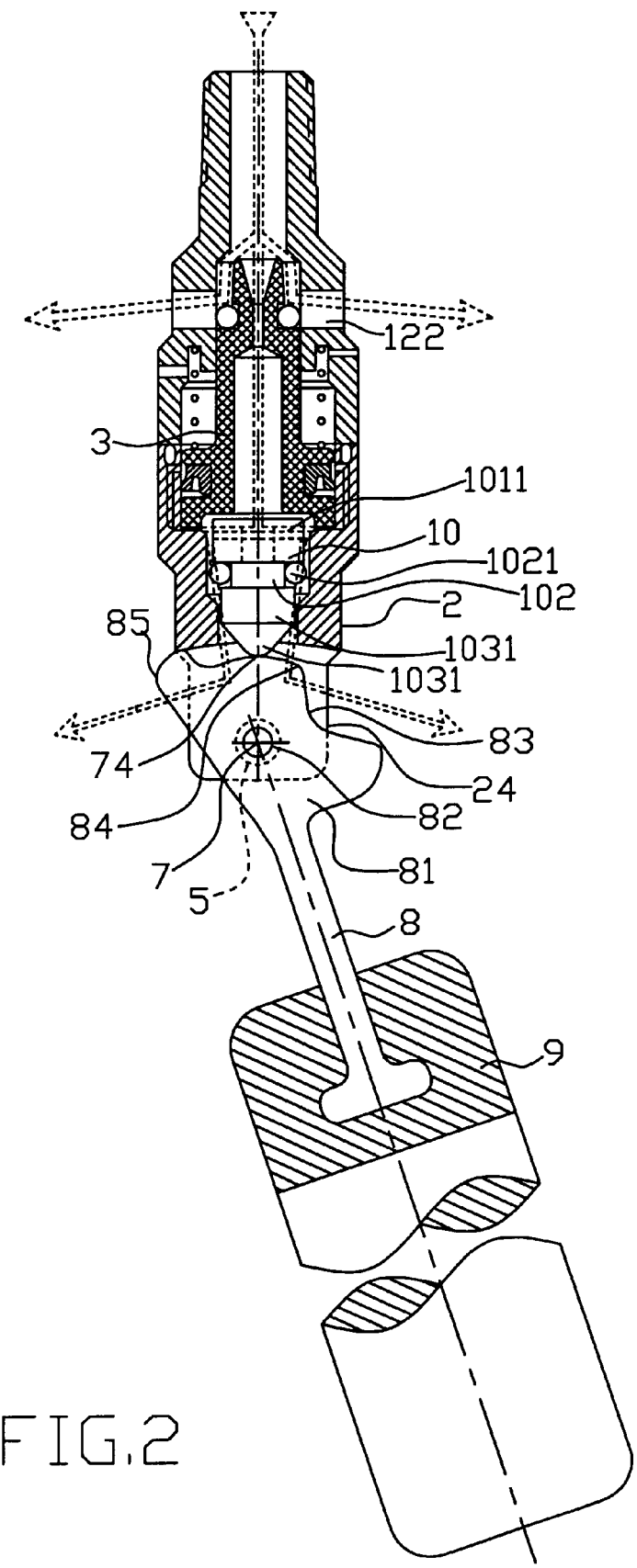
FIG. 2 is a longitudinal sectional view of the overfill protection device in the filling position.
Figure 3:
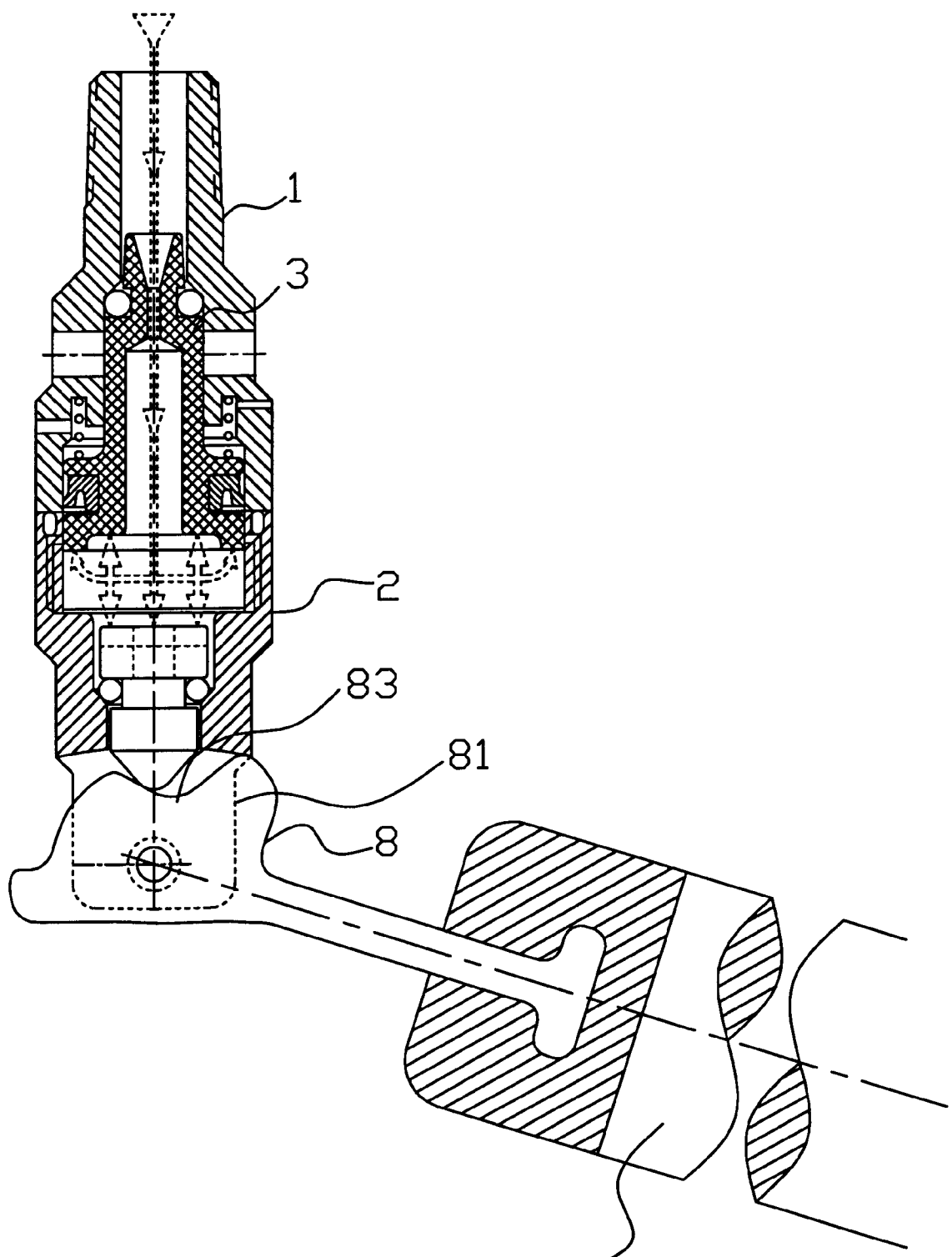
FIG. 3 is a longitudinal sectional view of the overfill protection device in the stop-fill position.

When in use, the upper end of the first tubular member 1 of the overfill protection device according to the present invention is connected to a pressure valve (not shown). The pressure valve may be of any conventional design well known to those skilled in the art and is not considered a part of the invention. As the pressure valve is turned open, gas will flow through the pressure valve and the overfill protection device into a tank (not shown). The float 9 will be positioned as shown in FIG. 2 when pressurized gas is being filled into the tank. As illustrated in FIG. 2, the lobe 85 of the cam plate 81 of the float rod 8 bears against the wall of the second tubular member 2 thereby disposing the float rod 8 at an inclined position with respect to the second tubular member 2, while the convex edge 84 of the cam plate 81 is in contact with the conical lower end 1031 of the plug 10 thereby preventing the plug 10 from moving downwardly to close the axial through hole 231 of the second tubular member 2 and therefore enabling the gas to flow through the first tubular member 1, the piston 3 and the second tubular member 2 into the tank. Meanwhile, the spring 6 pushes the piston 3 to move downwardly against the second tubular member 2 hence enabling the gas to flow through the first tubular member 1 and the radial through holes 122 into the tank. However, as the pressure within the tank reaches the predetermined level, the float 9 will be rotated upwardly with respect to the second tubular member 2 thereby moving the concave edge 83 of the cam plate 81 of the float rod 8 to the position right under the conical lower end 1031 of the plug 10 and therefore causing the plug 10 to be pushed by the gas to go downwardly (see FIG. 3) to close the axial through hole 231 of the second tubular member 2. As the gas cannot flow through the second tubular member 2, it will be forced to go upwardly thereby lifting the piston 3 until the first O-ring 4 bears against the first axial through hole 111 of the first tubular member 1 and the radial through holes 122 are closed by the intermediate portion 32 of the piston 3. Hence, no more gas is allowed to flow through the overfill protection device according to the present invention when the pressure within the tank exceeds the predetermined level.

Figure 4:
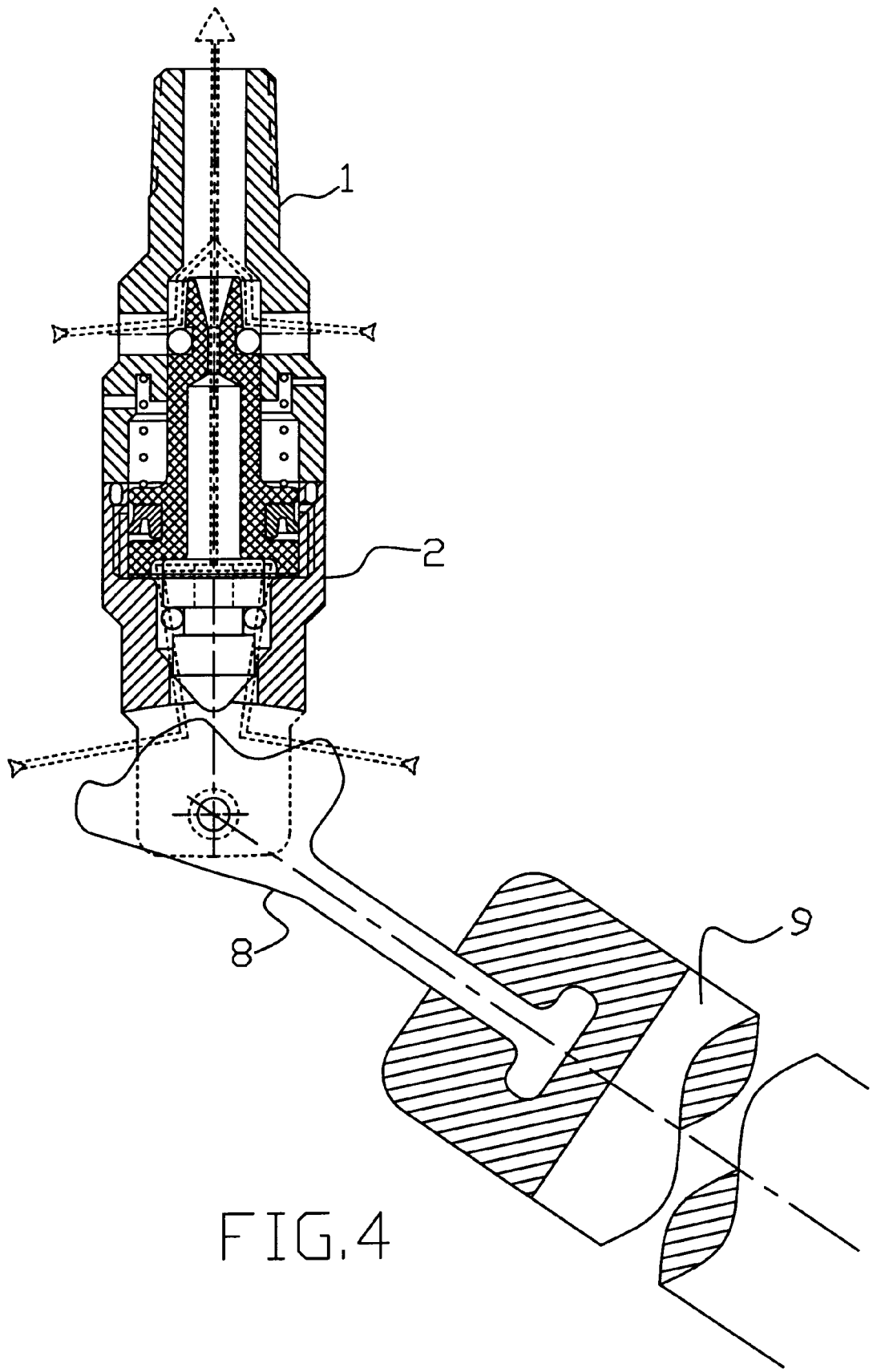
FIG. 4 is a longitudinal sectional view of the overfill protection device in the purging position.

FIG. 4 is a longitudinal sectional view of the overfill protection device in the purging position. As shown, most of the gas will directly flow out of the overfill protection device through the radial through holes 111 of the first tubular member 1. In other words, the flow rate of the gas in purging will not be limited by the small passage of the piston thus largely decreasing the time required for gas purging.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A overfill protection device comprising:

a first tubular member having an upper portion formed with a first axial through hole, an intermediate portion having a second axial through hole with a larger diameter than said first axial through hole and four radial through holes, a lower portion having a third axial through hole with a larger diameter than said second axial through hole and external threads, and an annular groove formed between said second and third axial through holes;

a cylindrical piston slidably fitted within said first tubular member and having an upper portion, dimensioned to fit into said first axial through hole, an intermediate portion having a larger diameter than said upper portion of said cylindrical pistion and dimensioned to fit into said second axial through, a lower portion having a larger diameter than said intermediate portion of said cylindrical piston and dimensioned to fit into said third axial through hole, a first neck portion between said upper and intermediate portions of said cylindrical piston, a second neck portion on said lower portion of said cylindrical piston, and a circular recess at a bottom of said lower portion of said cylindrical piston, said upper portion of said piston being formed with a through hole, said first neck portion having an axial through hole having same diameter as a lower end of said through hole of said upper portion of said piston, an axial through hole being formed in said intermediate and lower portions of said piston and having an upper and lower ends communicated with said axial through hole of said first neck portion and said circular recess;

a spring arranged within said third axial through hole of said lower portion of said first tubular member and fitted over said intermediate portion of said piston, said spring having an upper and lower ends respectively bearing against said annular groove and said lower portion of said first tubular member;

a first and second O-rings fitted in said first and second neck portions of said piston respectively;

a second tubular member having an upper portion having a cylindrical recess open at a top and provided with internal threads engageable with said external threads of said first tubular member, an intermediate portion having an axial through hole with a smaller diameter than said third axial through hole of said first tubular member, and a lower portion having an axial through hole with a smaller diameter than said axial through hole of said intermediate portion, said lower end of the second tubular member being divided by a diametrical slot;

a plug having an upper portion formed with a neck portion fitted with a O-ring and a lower portion having a smaller diameter than said axial through hole of said second tubular member and formed with a conical lower end, said plug being arranged within said second tubular member and located under said piston;

a float rod having a cam plate at an upper end thereof, said cam plate being fitted into said slot of said second tubular member and pivotally connected thereto by a spindle extending through said second tubular member and said cam plate, said cam plate being contoured to form a lobe, a convex edge and a concave edge; and a float fixedly connected with a lower end of said float rod.

2. The overfill protection device as claimed in claim 1, wherein two of said radial through holes are aligned with another two of said radial through holes and two axes through the radial through holes intersect at an angle of 40–50 degrees.

3. The overfill protection device as claimed in claim 1, wherein said conical through hole of said piston has an upper diameter and a lower diameter which are in a ratio of three to one.

4. The over fill protection device as claimed in claim 1, wherein said first tubular member is formed with a radial perforation extending through said first tubular member to communicate with said annular groove.

\* \* \* \* \*